UNITED STATES PATENT OFFICE.

HORACE PATTENGELL, OF SCHOOLCRAFT, ASSIGNOR TO GILBERT A. WATKINS, OF DETROIT, MICHIGAN.

IMPROVEMENT IN COMPOSITIONS FOR SLATE.

Specification forming part of Letters Patent No. 199,859, dated January 29, 1878; application filed December 18, 1877.

*To all whom it may concern:*

Be it known that I, HORACE PATTENGELL, of Schoolcraft, in the county of Kalamazoo, and in the State of Michigan, have invented certain new and useful Improvements in Compositions for Slate; and do hereby declare that the following is a full, clear, and exact description thereof, reference being had to the accompanying drawings, and to the letters of reference marked thereon, making a part of this specification.

The nature of my invention consists in a compound for artificial slating, as will be hereinafter more fully set forth.

This compound is composed of the following ingredients, in about the following proportions: Alcohol, one gallon; shellac, two pounds; white glue, two ounces; naphtha, one-half gallon; copperas, one-half pound; ether, one pound; rubber, one pound; soap-stone, one pound; alum, two ounces; ground marble, two pounds; pumice-stone, two pounds; drop-black, one pound; zinc, one pound; pulverized glass, one ounce.

These ingredients, when properly mixed together, form a liquid, which is to be applied with a brush.

It is applicable for slating, blackboards, and other purposes.

I do not confine myself to the precise proportions of the ingredients herein mentioned, as they may be varied according to the quality of the work intended to be done.

Having thus fully described my invention, what I claim as new, and desire to secure by Letters Patent, is—

The within-described compound for artificial slating and other purposes, composed of alcohol, shellac, white glue, naphtha, copperas, ether, rubber, soap-stone, alum, ground marble, pumice-stone, drop-black, zinc, and pulverized glass, substantially as herein set forth.

In testimony that I claim the foregoing I have hereunto set my hand this 20th day of November, 1877.

HORACE PATTENGELL.

Witnesses:
H. A. TOULMIN,
JEREMIAH McCARTHY.